Jan. 4, 1966  G. B. ANDERSON  3,227,114
COMBUSTION, VAPORIZATION WASTE RECEPTACLE
Filed March 26, 1962  2 Sheets-Sheet 1

*INVENTOR.*
GEORGE B. ANDERSON
BY
HIS ATTORNEY

Jan. 4, 1966    G. B. ANDERSON    3,227,114
COMBUSTION, VAPORIZATION WASTE RECEPTACLE
Filed March 26, 1962    2 Sheets-Sheet 2

INVENTOR.
GEORGE B. ANDERSON
BY *M. Ralph Shaffer*
HIS ATTORNEY

United States Patent Office 3,227,114
Patented Jan. 4, 1966

3,227,114
COMBUSTION, VAPORIZATION WASTE
RECEPTACLE
George B. Anderson, 4058 Diana Way,
Salt Lake City, Utah
Filed Mar. 26, 1962, Ser. No. 182,235
1 Claim. (Cl. 110—9)

The present invention relates to waste receptacles and, more particularly, to a new and improved waste receptacle wherein organic and inorganic contents deposited in the receptacle, of either solid or liquid form may be converted into gaseous combustion and vaporization products so as to be adapted for exhaust into the atmosphere.

Accordingly, an object of the present invention is to provide a new and improved waste receptacle, ideally adapted for design as a toilet, which will convert the contents deposited there into either gaseous combustion products (with or without solids suspended therein), vaporized products, or both.

A further object of the present invention is to provide a new and improved waste receptacle of the type described wherein the act of closing the lid provided therefor automatically produces the closing of the fire bowl of the structure so that firing thereof may be accomplished automatically in a safe and effective manner.

A further object of the present invention is to provide a waste receptacle of the type described wherein the same is completely self-contained, requiring no auxiliary source of electrical power in order to be fully automatically operable.

A further object of the present invention is to provide a waste receptacle of the type described which can be made portable.

The features of the present invention which are believed to be novel are set forth with particularity in the appended claim. The present invention, both as to its organization and manner of operation, together with further objects and advantages thereof, may best be understood by reference to the following description, taken in connection with the accompanying drawings in which:

Figure 1:
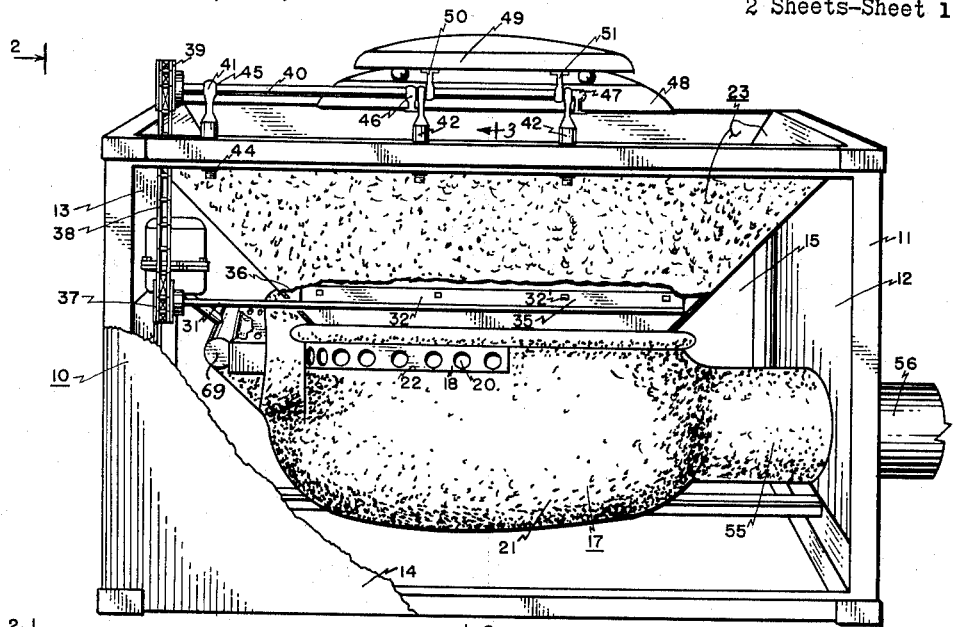
FIGURE 1 is a front perspective view, partially cut away for purposes of clarity of illustration, of the basic structure of a preferred embodiment of the invention.
Figure 4:
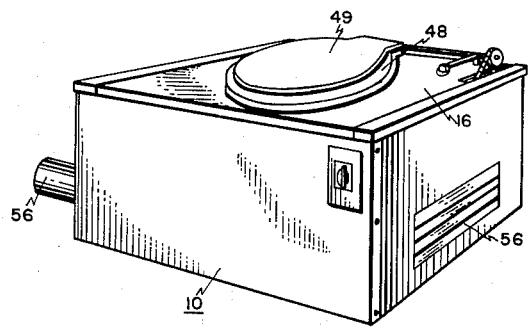
FIGURE 4 is a perspective view, reduced in scale, of the complete structure shown in FIGURES 1, 2 and 3.

In FIGURE 1 cabinet 10 includes a frame 11 having a plurality of sides 12, 13, 14, and 15 and a top 16 (not shown in FIGURE 1 but shown in FIGURE 4). Rigidly mounted within the frame is a fire bowl 17 comprising a metallic bowl member 18 having an asbestos or other insulative exterior lining 19. The fire bowl 17 includes air intake apertures 20 which provide oxygen for the flame therewith. As shown in FIGURE 1, the asbestos lining 21 is relieved at 22 to provide for the air communication intended by virtue of the inclusion of air intake apertures 20.

Figure 3:
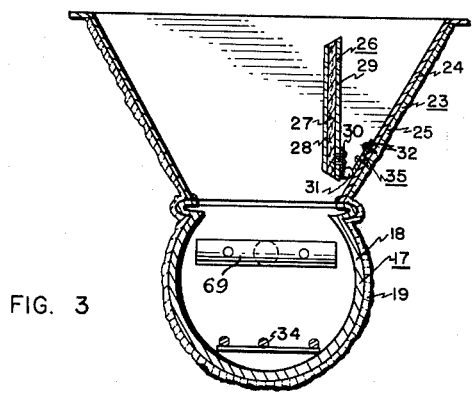
FIGURE 3 is a vertical transverse section taken along the lines 3—3 of FIGURE 1, illustrating the construction of the fire bowl and waste admittance conduit structure.

Integral with or rigidly mounted to the fire bowl 17 is certain waste admittance conduit 23, comprising an inner, metallic, hollow member 24 and an exterior asbestos or other insulative lining 25. Formed preferably in a sandwich structure is a fire door 26 which, as shown in FIGURE 3, comprises a central layer of asbestos 27 or other insulative material backed on both sides by metallic or other suitable plates 28 and 29. Plate 29 of the fire door 26 is secured to a piano hinge half 30, and the latter is affixed to an elongate hinge rod 31 such that the rotation of hinge rod 31 automatically produces the rotational displacement of fire door 26. The remaining hinge half 32 is fixedly secured to waste admittance conduit 23 by suitable attachments as shown in FIGURE 3. The hinge 35, of which hinge halves 30 and 32 together with hinge rod 31 comprise respective parts, is also illustrated in FIGURE 1.

Optionally disposed in the bottom area of fire bowl 17 is a grate 34 which extends in a substantially horizontal and longitudinal direction.

Waste admittance conduit 23 is provided with an aperture 36 which provides access for hinge rod 31. Again, the hinge half 32 in FIGURES 1 and 3 is rigidly secured by attachments 32′ to the bowl member 18 so that additional journaling of hinge rod 31, other than the journaling by virtue of the piano hinge journal connection between hinge rod 31 and hinge half 32, is not required. The hinge rod 31 is provided with a gear 37 and a chain 38 or other coupling means which couples gear 37 to gear 39, the gears 37 and 39 being respectively fixedly mounted and keyed to hinge rod 31 and journal rod 40, respectively. Journal mounts 41, 42, and 43 are conventional in design and are mounted by suitable attachments 44 to the frame 11. Each of the journal mounts 41 includes an aperture 45, and all of the apertures 45 are coaxial with respect to each other so as to receive rod 40. Journal mounts 46 and 47 are fixedly secured by conventional means to toilet seat 48 and likewise are mounted upon and journal the journal rod 40. Finally, toilet lid 49 is provided with journal mounts 50 and 51 which are pivotally mounted upon journal rod 40 so that the toilet lid 49 and, in addition, the toilet seat 48 may be manually pivotally displaced about the axis of journal rod 40, as desired. Actuator member 52 is welded or otherwise secured either to the gear 39 or the rod 40 and, in any event, is adapted to engage button 53 of switch 54 upon the downward movement of toilet lid 49 to "close" position. The switch 54 shall be described hereinafter; its function is to start the firing system into operation.

As to mechanical structure, it is to be noted that the placement of toilet lid 49 in the horizontal position to fully enclose the cabinet 10 simultaneously produces the engagement of member 52 with button 53 of switch 54 so as to close the electrical circuit involved; also, by virture of the coupling of gears 39 and 37, this produces the downward, rotationally displaceable movement of fire door 26 so that the latter, by virtue of its chamfered edges, will fully enclose the fire bowl 17 and separate the same from the waste admittance conduit 23. Hence, the fire bowl will be closed when the system is actuated to produce the combustion and/or vaporization of contents within the fire bowl 17. Correspondingly, inadvertent actuation of the firing means is prevented by virtue of the fact that when the structure is in use, the toilet lid 49 will be disposed upwardly so that there will be no engagement of member 52 and switch 54.

Finally, fire bowl 17 is provided with an exhaust boss 55 which receives exhaust conduit 56 for carrying gaseous waste products from the fire bowl to the atmosphere. Air is supplied the flame produced within the fire bowl by means of louvered openings 56 and the aforementioned intake apertures 20 disposed at the top portion of the fire bowl 17.

Figure 2:
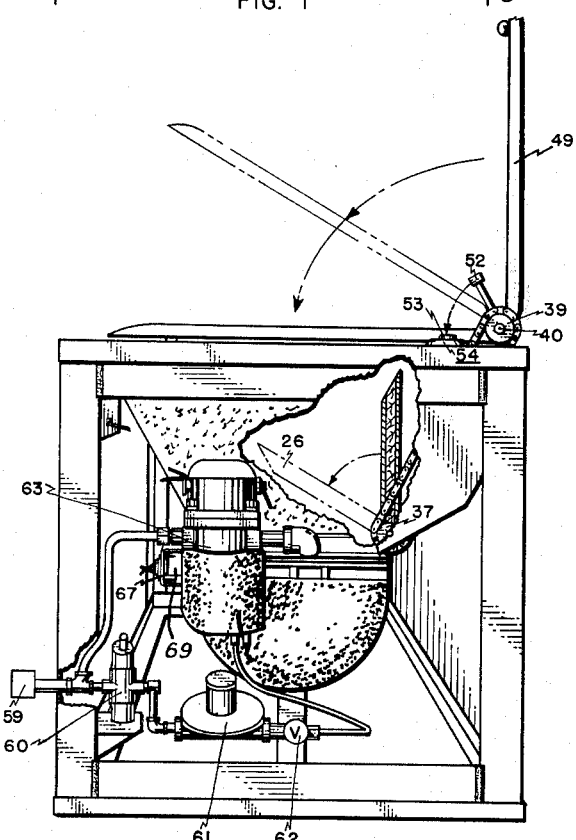
FIGURE 2 is a side elevation taken along line 2—2 in FIGURE 1 of the structure shown in FIGURE 1, and is likewise broken away for convenience of illustration.
Figure 7:
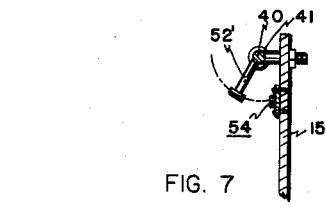
FIGURE 7 is an enlarged, fragmentary sectional view taken along the line 7—7 in FIGURE 6.
Figure 6:
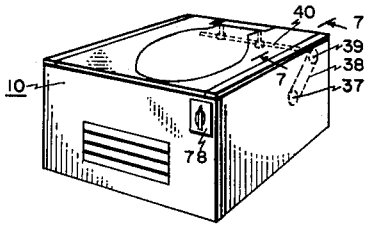
FIGURE 6 is a perspective view, reduced in scale, of structure incorporating a slight modification in the lid area of the structure.

In FIGURES 6 and 7 is illustrated an optional construction wherein the gears 39 and 37, drive chain 38, and journal rod 40 are disposed completely within the structure. FIGURE 6 illustrates that this is possible, with the engagement member 52' (similar to 52), this time engaging the switch 54 in a similar manner as shown in FIGURE 2, with the latter being mounted to the back panel 15 and a journal rod 40 being journaled by the journal mounts aforementioned which are secured to back panel 15.

As to the fuel system the same will include a fuel source 59, pilot safety control 60, pilot pressure control 61, an optionally included valve 62, and a general control 63. These elements are shown in FIGURE 2. A more complete disclosure of the entire burning and electrical systems is illustrated in FIGURE 5.

Figure 5:
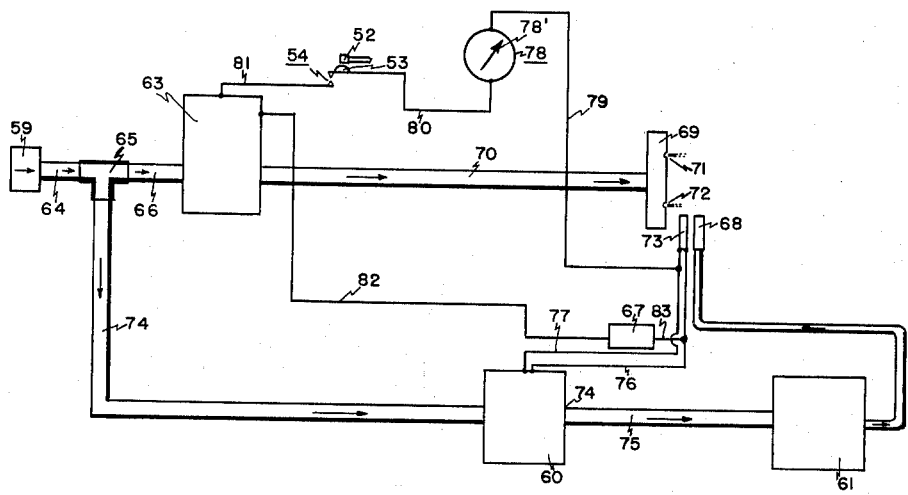
FIGURE 5 is a schematic diagram of the fuel and electrical systems associated with the invention.

In FIGURE 5 the fuel source 59 may comprise any one of a number of sources such as a butane source of fuel, a connection to a natural gas line, or a source of other liquid or gaseous fuels.

At this point it should be mentioned that the following parts are conventional in hot water heater equipment, for example: the general control 63 by which the main supply of fuel is shut off, pilot safety control 60, pilot pressure control 61, temperature safety control 67, pilot 68, burner 69, and static electricity generating thermocouple 73.

Conduit 64 interconnects the fuel source 59 with T 65. One of the output sides of T 65 is coupled by conduit 66 to the general control 63 which is employed.

It will be noted with reference to FIGURE 5 that the outlet side of general control 63 is connected directly to conduit 70 the remaining extremity of which is directly connected to burner 69. Burner 69 may be in one of several forms having one or a plurality of outlet orifices 71 and 72 which produce flame jets. Pilot 68 is located in close proximity with respect thereto as is also a conventional, static electricity generating thermocouple 73 the operation of which is to produce electricity in response to the heat of pilot 68 and burner 69. Returning to a consideration of the fuel system it will be seen that conduit 74 connects to the remaining outlet side of T 65 and leads directly to the input of pilot safety control 60, the output side 74 of pilot safety control 60 is coupled directly by conduit 75 to pilot pressure control 61. There will be the usual adjustment for the pilot pressure control 61 in the form of a valve which controls the height of the pilot flame.

Static electricity generating thermocouple 73 is conventionally found in hot water heating systems. Coupled thereto are a pair of electrical leads 76 and 77 which are connected directly to the conventional pilot safety control 60. As is well known in the art, the heat of the pilot 68 is in part converted into electricity at thermocouple 73 which keeps the pilot safety control 60 open through a solenoid valve or other suitable means. Where the pilot is off then the thermocouple 73 no longer generates electricity so that the pilot safety control will be internally switched by electrical means to a non-conductive state, thus precluding the discharge of fuel from pilot 68 when a flame is not present thereat. Thermocouple 73 is also coupled in a series circuit through adjustable timer 78, switch 54, general control 63, temperature safety control 67, and back to thermocouple 73 by the inclusion of leads 79, 80, 81, 82 and 83 respectively. The electric timer 78 is a manually preset type which electrically opens upon the timer hand 78' returning to "zero" position. The toilet lid switch 54 has already been previously discussed. When the pilot 68 is lit, then, providing switch 54 is closed, the general control 63 will receive sufficient electrical current from thermocouple 73 to keep the general control open for the conducting of fuel therethrough, provided of course the temperature safety control 67 is also closed. Control 67 may comprise a bi-metallic strip disposed in proximity with but exterior to the fire bowl of the structure so that when the temperature exceeds a predetermined value within cabinet 10, then the control will open so as to interrupt the electrical circuit through general control 63 and turn off the main supply of fuel thereto, thereby precluding the transmission of fuel to burner 69. It is to be noted that the circuit of general control 63 is an electrical series circuit so that in event either switch 54 is open, temperature safety control 67 is open, or if the timer 78 is at zero position, then fuel will not be conducted to main burner 69. Where, however, the switch 54 is closed and the timer (normally closed while running) is closed, and, further, while the temperature of the unit is maintained within safe limits so that temperature safety control 67 remains closed, then fuel will be conducted to burner 69 so as to achieve the combustion and vaporization of products within the fire bowl 17 as desired.

It is seen that the unit is ideally suited for portability such as for use in campers and so forth. A supply of butane fuel or other gaseous fuel may be carried by the camping party and be used to operate the system without an auxiliary source of electricity, owing to the inclusion of static electricity generator thermocouple 73.

Disposable bags will preferably be used for enclosing contents to be fired. Suitable bags, such as those manufactured from polyethelene, are on the market currently in several forms.

Generally speaking, the pressure of the fuel supply for burner 69 will be sufficient to produce the desired draft of combustion and vaporization products out of fire bowl 17 and exhaust conduit 56, and also, out of any vertical conduit riser which may be affixed to the latter. If additional draft is desired, then obviously blower means may be disposed in communicative relationship with fire bowl 17 to provide the draft required.

While particular embodiments of the present invention have been shown and described, it will be obvious to those skilled in the art that changes and modifications may be made without departing from this invention in its broader aspects, and, therefore, the aim in the appended claim is to cover all such changes and modifications as fall within the true spirit and scope of this invention.

I claim:

In a combustion and vaporization waste receptacle including, in combination, a fire bowl, means fixedly disposed with respect to said fire bowl for introducing flame therewithin, exhaust conduit means affixed to and communicating with said fire bowl for conducting combustion and vaporization products from said fire bowl, waste admittance conduit disposed above, affixed to and communicating with said fire bowl, a continuously movable lid hingedly disposed over and affixed to said waste admittance conduit, a fire door spaced from said lid and disposed interior of and proximate the juncture of said fire bowl and said conduit admittance aperture, means for hingedly affixing said fire door in position so that communication between said fire bowl and said waste admittance conduit may be selectively provided for and interrupted upon the opening and closing, respectively, of said fire door, means intercoupling said lid and said fire door and disposed laterally of said lid and fire door and removed from the space therebetween for opening said fire door upon the raising of said lid, means operable upon the lowering of said lid for actuating said flame-introducing means while said lid remains closed, and means for automatically de-actuating said flame-introducing means after a desired time of flame introduction into said fire bowl; an improvement wherein said hingedly affixing means includes an axial hinge rod fixedly secured to said fire door for rotational movement in accordance with the hinged movement of the latter, said lid including a journal rod rotatable in accordance with hinged movement of said lid, and means disposed outside of the said waste admittance conduit beneath said toilet seat and mounted upon said journal rod and said hinge rod for intercoupling said journal rod with said hinge rod for coupling said journal rod to said hinge rod for interdependent motion.

References Cited by the Examiner

UNITED STATES PATENTS

| | | | |
|---|---|---|---|
| 1,432,740 | 10/1922 | Blane | 110—9 X |
| 2,114,446 | 4/1938 | Hildebrecht | 158—130 X |
| 2,882,534 | 4/1956 | Jauch | 110—9 X |
| 3,059,597 | 10/1962 | Wood | 110—9 |
| 3,092,049 | 6/1963 | Wood | 110—9 |
| 3,103,017 | 9/1963 | La Mere | 110—9 X |

FREDERICK L. MATTESON, Jr., *Primary Examiner.*

ROBERT A. O'LEARY, JAMES W. WESTHAVER,
*Examiners.*